(12) United States Patent
An et al.

(10) Patent No.: US 12,347,616 B2
(45) Date of Patent: Jul. 1, 2025

(54) SUPERCAPACITOR ELECTRODE MATERIAL INCLUDING CARBON MATERIAL WHERE PHOSPHORUS AND BORON ARE DOPED THEREON AND METHOD FOR MANUFACTURING SAME

(71) Applicant: INDUSTRY-ACADEMIC COOPERATION FOUNDATION GYEONGSANG NATIONAL UNIVERSITY, Gyeongsangnam-do (KR)

(72) Inventors: Geon Hyoung An, Gyeongsangnam-do (KR); Young Geun Lee, Incheon (KR)

(73) Assignee: INDUSTRY-ACADEMIC COOPERATION FOUNDATION GYEONGSANG NATIONAL UNIVERSITY, Gyeongsangnam-do (KR)

( * ) Notice: Subject to any disclaimer, the term of this patent is extended or adjusted under 35 U.S.C. 154(b) by 250 days.

(21) Appl. No.: 18/022,993

(22) PCT Filed: Aug. 25, 2021

(86) PCT No.: PCT/KR2021/011340
§ 371 (c)(1),
(2) Date: Jun. 15, 2023

(87) PCT Pub. No.: WO2022/045756
PCT Pub. Date: Mar. 3, 2022

(65) Prior Publication Data
US 2023/0326686 A1    Oct. 12, 2023

(30) Foreign Application Priority Data
Aug. 26, 2020 (KR) .......................... 10-2020-0107887

(51) Int. Cl.
*H01G 11/36* (2013.01)
*H01G 11/04* (2013.01)
(Continued)

(52) U.S. Cl.
CPC ............. *H01G 11/36* (2013.01); *H01G 11/04* (2013.01); *H01G 11/32* (2013.01); *H01G 11/86* (2013.01)

(58) Field of Classification Search
CPC ........ H01G 11/86; H01G 11/04; H01G 11/36; H01G 11/32
See application file for complete search history.

(56) References Cited

FOREIGN PATENT DOCUMENTS

| CN | 102013335 A | * | 4/2011 |
|----|-------------|---|--------|
| CN | 105070517 A | * | 11/2015 |

(Continued)

OTHER PUBLICATIONS

Young-Geun Lee et al., "Synergistic Effects of Phosphorus and Boron co-Incorporated Activated Carbon for Ultrafast Zinc Ion Hybrid Supercapacitors," ACS Appl. Mater. Interfaces, vol. 12, Aug. 2020, pp. 41342-41349.

*Primary Examiner* — David M Sinclair
(74) *Attorney, Agent, or Firm* — JCIPRNET

(57) ABSTRACT

The present invention relates to a supercapacitor electrode material, and a method for manufacturing same. One aspect of the present invention provides a supercapacitor electrode material including: a carbon material; and phosphorus (p) and boron (b) doped into the carbon material.

11 Claims, 17 Drawing Sheets

(51) Int. Cl.
*H01G 11/32* (2013.01)
*H01G 11/86* (2013.01)

(56) References Cited

FOREIGN PATENT DOCUMENTS

| | | | | |
|---|---|---|---|---|
| CN | 105702473 | A | * | 6/2016 |
| CN | 106115652 | A | * | 11/2016 |
| KR | 20140120600 | A | * | 10/2014 |
| KR | 1020160059440 | | | 5/2016 |
| KR | 101629164 | | | 6/2016 |
| KR | 1020180103086 | | | 9/2018 |
| KR | 1020200003867 | | | 1/2020 |
| WO | WO-2019080689 | A1 | * | 5/2019 ............. H01G 11/60 |

* cited by examiner

Example 1

Comparative Example 1

Comparative Example 2

Comparative Example 3

SUPERCAPACITOR ELECTRODE MATERIAL INCLUDING CARBON MATERIAL WHERE PHOSPHORUS AND BORON ARE DOPED THEREON AND METHOD FOR MANUFACTURING SAME

CROSS-REFERENCE TO RELATED APPLICATION

This application is a 371 of international application of PCT application serial no. PCT/KR2021/011340, filed on Aug. 25, 2021, which claims the priority benefit of Korea application no. 10-2020-0107887, filed on Aug. 26, 2020. The entirety of each of the above mentioned patent applications is hereby incorporated by reference herein and made a part of this specification.

TECHNICAL FIELD

The following description relates to a supercapacitor electrode material and a method for manufacturing the same.

BACKGROUND ART

Electrochemical capacitors have various advantages such as high power density, fast charging and discharging speed, and long lifespan, and thus are being spotlighted as electrochemical energy storage devices that may be applied to electric vehicles, electronic devices, memory backup devices, and high-power equipment. Recently, with the rapid expansion of the supercapacitor industry and the development of application fields, long cycle stability of 30,000 cycles or more is required due to ultra-fast charging performance at high current density.

Electrochemical capacitors are generally classified into three types according to their energy storage mechanism. Specifically, they are classified into an electric double layer capacitor (EDLC) that accumulates energy using a non-Faraday reaction, a pseudocapacitor (PC) that collects energy through a Faraday reaction, and a hybrid supercapacitor that collects energy by a combination of the Faraday and non-Faraday reactions.

Among them, the hybrid supercapacitor combines various advantages of the EDLC and the PC to provide high energy density due to redox reaction at the anode and high power density due to the electric double layer at the cathode.

In addition, problems of currently available batteries, for example, disadvantages such as the low energy density of lead batteries, the safety hazards of lithium ion batteries, and the low cycling stability of alkaline zinc/manganese oxide batteries, are further promoting research and development of hybrid supercapacitors.

Recently, metallic lithium, sodium, and potassium having high capacities have been widely introduced into anode materials of hybrid supercapacitors, and such anode materials cause serious safety problems due to excessive reactivity.

In comparison, since zinc is relatively stable than lithium, sodium, and potassium, has a high theoretical capacity and excellent compatibility with electrolytes, and thus has the advantage capable of achieving high energy density and long lifespan, a hybrid supercapacitor using zinc as an anode is considered as an emerging energy storage device.

However, zinc ion hybrid supercapacitors have limitations in application to energy storage devices requiring high rate performance and long cycle life at high current densities due to inappropriate electrical properties and poor wettability between the electrode and the electrolyte.

Specifically, in a cathode in which a carbon material such as activated carbon is used, wettability between the electrode and the electrolyte is low, and accordingly, the ion diffusion ability deteriorates, thereby retaining low energy storage capacity according to a short charge/discharge time under a high current density. In addition, activated carbon has low electrical conductivity, and thus drops the overall storage capacity of the zinc ion supercapacitor.

Therefore, research and development of cathode materials are required in order to improve the electrochemical performance of zinc ion hybrid supercapacitors.

The above background art is possessed or acquired by the inventor in the process of deriving the disclosure of the present application, and cannot necessarily be said to be known art disclosed to the general public prior to the present application.

DISCLOSURE OF THE INVENTION

Technical Goals

The present disclosure is to solve the above problems, and an aspect of the present disclosure is to provide an electrode material for improving the energy storage capacity of a hybrid supercapacitor, and a method for manufacturing the same.

However, technical goals to be achieved are not limited to those described above, and other goals not mentioned above are clearly understood by one of ordinary skill in the art from the following description.

Technical Solutions

One aspect of the present disclosure provides a supercapacitor electrode material including: a carbon material; and phosphorus (P) and boron (B) doped on the carbon material.

According to one embodiment, the carbon material may include one or more selected from the group consisting of activated carbon, graphene, graphite, carbon nanotubes, carbon nanofibers, and fullerenes.

According to one embodiment, the phosphorus atom may be contained in an amount of 0.01 atomic % to 10 atomic %, and the boron atom may be contained in an amount of 0.01 atomic % to 10 atomic %.

According to one embodiment, phosphorus and boron may have a molar ratio in a range of 1:0.1 to 10.

According to one embodiment, the carbon material may include a carbon lattice structure, and some carbons in the carbon lattice structure may be replaced with phosphorus and boron to form $PCO_3$ and $BC_3$.

Another aspect of the present disclosure provides a method for manufacturing a supercapacitor electrode material, the method including the steps of: preparing an aqueous solution in which phosphorus and a boron precursor are mixed; coating a carbon material with the aqueous solution; and heat-treating the carbon material coated with the aqueous solution in an inert atmosphere.

According to one embodiment, the boron precursor may include one or more selected from the group consisting of $B_2O_3$, $B(OC_2H_5)_4$, and $H_3BO_3$.

According to one embodiment, the boron precursor and phosphorus may have a molar ratio in a range of 1:0.1 to 10.

According to one embodiment, the step of coating the aqueous solution on the carbon material may be performed by stirring the mixture in which the carbon material is added to the aqueous solution with a planetary ball mill for 1 hour to 5 hours.

According to one embodiment, a step of drying the carbon material coated with the aqueous solution after the step of coating the carbon material with the aqueous solution may be further included.

According to one embodiment, the heat treatment step may be performed at a temperature of 500° C. to 1,000° C. for 3 hours to 10 hours.

Another aspect of the present disclosure provides a supercapacitor including: a cathode containing the electrode material or an electrode material manufactured by the manufacturing method; an anode containing a metal material; an electrolyte; and a separator.

According to one embodiment, the metal material may include one or more selected from the group consisting of zinc, lithium, sodium, and potassium.

According to one embodiment, the supercapacitor according to the present disclosure may have a specific capacity of 160 mAh/g or more at a current density of 0.5 A/g, and a specific capacity of 80 mAh/g or more at a current density of 10 A/g.

According to one embodiment, the supercapacitor according to the present disclosure has a capacity retention rate after 2,000 charge/discharge cycles of 95% or more at a current density of 0.5 A/g, and a capacity retention rate after 30,000 charge/discharge cycles of 85% or more at a current density of 10 A/g.

According to one embodiment, the supercapacitor according to the present disclosure may be zinc-ion hybrid supercapacitors (ZICs).

Effects

The supercapacitor electrode material according to the present disclosure includes a carbon material doped with phosphorus and boron, and thus improves wettability and electrical conductivity between the electrode and the electrolyte, thereby having an effect of improving energy storage performance of the supercapacitor.

In addition, in the method for manufacturing a supercapacitor electrode material according to the present disclosure, a supercapacitor electrode material with improved wettability through the oxygen functional group of $PCO_3$ and improved electrical conductivity through $BC_3$ may be manufactured by forming $PCO_3$ and $BC_3$ in the carbon material lattice structure through a relatively simple process of coating and heat-treating a carbon material with a solution containing phosphorus and a boron precursor.

Furthermore, the supercapacitor according to the present disclosure has excellent energy density and power density, and has an effect in which the capacity retention rate after 30,000 charge/discharge cycles is excellent at a high current density.

BEST MODE FOR CARRYING OUT THE INVENTION

Figure 1:
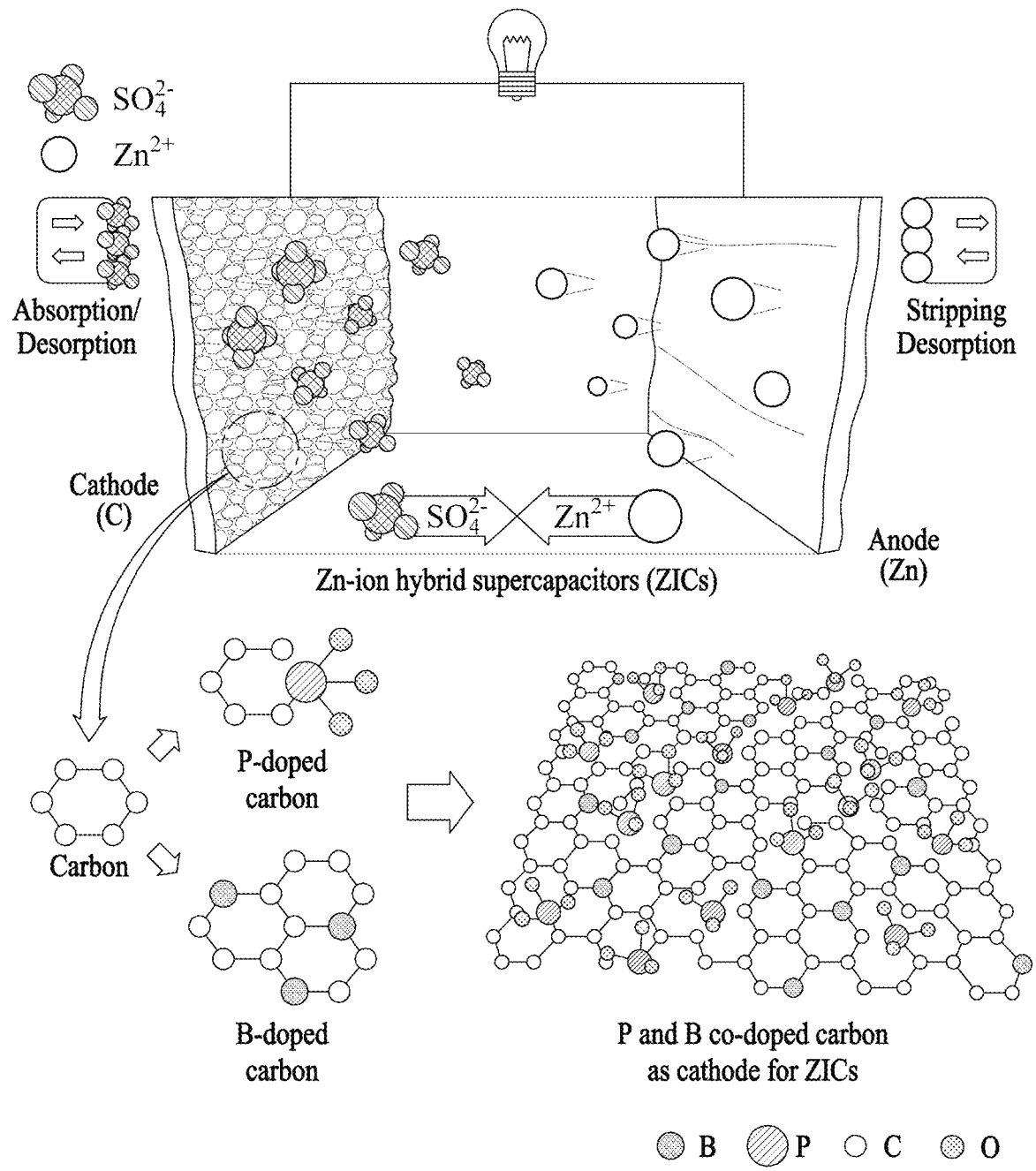
FIG. 1 is a schematic view schematically illustrating a hybrid supercapacitor according to one embodiment of the present disclosure.

Hereinafter, examples will be described in detail with reference to the accompanying drawings. However, since various changes may be made to the examples, the scope of rights of the patent application is not restricted or limited by these examples. It should be understood that all modifications, equivalents and substitutes for the examples are included in the scope of the rights.

The terms used in the examples are used for the purpose of description only, and should not be construed as an intention to limit the present disclosure. The singular expression includes the plural expression unless the context clearly dictates otherwise. In the present specification, it should be understood that a term such as "include". "have", or the like is intended to designate that a feature, a number, a step, an operation, a component, a part, or a combination thereof described in the specification exists, but it does not preclude the possibility of existence or addition of one or more other features, numbers, steps, operations, components, parts, or combinations thereof.

Unless defined otherwise, all terms used herein, including technical or scientific terms, have the same meaning as those commonly understood by one of ordinary skill in the art to which the examples belong. Terms such as those defined in a commonly used dictionary should be interpreted as having a meaning consistent with the meaning in the context of the related art, and should not be interpreted in an ideal or excessively formal meaning unless explicitly defined in the present application.

Further, in the description with reference to the accompanying drawings, the same constituent elements are assigned the same reference numerals regardless of the reference numerals, and the overlapping description thereof will be omitted. In the description of the examples, if it is determined that a detailed description of a related known technology may unnecessarily obscure the gist of the examples, the detailed description will be omitted.

Further, in describing constituent elements of the embodiments, terms such as first, second, A, B, (a), and (b) may be used. These terms are only for distinguishing the constituent elements from other constituent elements, and essences, orders, sequences, or the like of the corresponding constituent elements are not limited by the terms. When it is described that a constituent element is "linked", "coupled" or "connected" to other constituent element, the constituent element may be directly linked or connected to the other constituent element, but it should be understood that another constituent element may also be "linked", "coupled" or "connected" between the respective constituent elements.

Constituent elements included in any Example and constituent elements including a common function will be described using the same names in other embodiments. Unless otherwise stated, descriptions described in any one Example may also be applied to other embodiments, and detailed descriptions will be omitted within the overlapping range.

One aspect of the present disclosure provides a supercapacitor electrode material including: a carbon material; and phosphorus (P) and boron (B) doped on the carbon material.

The supercapacitor electrode material according to the present disclosure has an effect in which both wettability with an electrolyte and electrical conductivity are improved by simultaneously doping the carbon material with phosphorus and boron.

According to one embodiment, the carbon material may include one or more selected from the group consisting of activated carbon, graphene, graphite, carbon nanotubes, carbon nanofibers, and fullerenes.

According to one embodiment, the phosphorus atom may be contained in an amount of 0.01 atomic % to 10 atomic %, and the boron atom may be contained in an amount of 0.01 atomic % to 10 atomic %.

Desirably, the phosphorus atom may be contained in an amount of 0.1 atomic % to 10 atomic %, and the boron atom may be contained in an amount of 0.1 atomic % to 10 atomic %. More desirably, the phosphorus atom may be contained in an amount of 1 atomic % to 10 atomic %, and the boron atom may be contained in an amount of 1 atomic % to 10 atomic %.

When phosphorus is contained in an amount of less than the above range, wettability of the supercapacitor electrode material with the electrolyte may decrease, and when phosphorus is contained in an amount of exceeding the above range, energy storage density may decrease.

In addition, when boron is contained in an amount of less than the above range, electrical conductivity of the supercapacitor electrode material may decrease, and when boron is contained in an amount of exceeding the above range, energy storage density may decrease.

According to one embodiment, phosphorus and boron may have a molar ratio in a range of 1:0.1 to 10.

Desirably, the phosphorus and boron may have a molar ratio in a range of 1:0.1 to 5, more desirably, 1:0.5 to 5, and even more desirably, 1:0.5 to 2.

The molar ratio range of phosphorus and boron may be an optimal range capable of simultaneously improving electrical conductivity and wettability with an electrolyte of the supercapacitor electrode material.

According to one embodiment, the carbon material may include a carbon lattice structure, and some carbons of the carbon lattice structure may be replaced with phosphorus and boron to form $PCO_3$ and $BC_3$.

According to one embodiment, the carbon lattice structure may have a form in which rings composed of 5 or 6 carbon atoms are repeatedly connected.

In the carbon material, some carbons of the carbon lattice structure, for example, one of the carbon elements constituting the hexagonal rings may be replaced with phosphorus or boron.

The hexagonal rings having a form in which one of the carbon elements is replaced with phosphorus or boron may exist adjacent to each other.

The $PCO_3$ may improve the wettability of the supercapacitor electrode material with the electrolyte by containing oxygen, and this may improve the charge connection at a high current density and thus ultimately improve the cycling stability and lifespan of the supercapacitor.

The $BC_3$ may induce changes in the electron density state and electronic structure of carbon to increase electrical conductivity, and ultimately improve the specific capacity and high-speed charge/discharge performance of the supercapacitor.

Another aspect of the present disclosure provides a method for manufacturing a supercapacitor electrode material, the method including the steps of: preparing an aqueous solution in which phosphorus and a boron precursor are mixed; coating a carbon material with the aqueous solution; and heat-treating the carbon material coated with the aqueous solution in an inert atmosphere.

In the method for manufacturing a supercapacitor electrode material according to the present disclosure, a supercapacitor electrode material may be manufactured in a relatively simple manner by doping phosphorus and boron in one-pot.

That is, a supercapacitor electrode material having improved wettability through the oxygen functional group of $PCO_3$ and improved electrical conductivity through $BC_3$ may be manufactured by forming $PCO_3$ and $BC_3$ in the carbon material lattice structure through a relatively simple process of coating the carbon material with the mixed solution of phosphorus and boron precursor and heat-treating it.

According to one embodiment, the boron precursor may include one or more selected from the group consisting of $B_2O_3$, $B(OC_2H_5)_4$, and $H_3BO_3$.

According to one embodiment, the carbon material may include one or more selected from the group consisting of activated carbon, graphene, graphite, carbon nanotubes, carbon nanofibers, and fullerenes.

According to one embodiment, the boron precursor and phosphorus may have a molar ratio in a range of 1:0.1 to 10.

Desirably, phosphorus and the boron precursor may a molar ratio in a range of 1:0.1 to 5, more desirably, 1:0.5 to 5, and even more desirably, 1:0.5 to 2.

The molar ratio range of phosphorus and the boron precursor is for doping the carbon material with phosphorus and boron in a certain molar ratio range, and may be an optimal range capable of improving the electrical conductivity of the supercapacitor electrode material and the wettability with the electrolyte at the same time.

According to one embodiment, the step of coating the carbon material with the aqueous solution may be performed by stirring a mixture in which the carbon material is added to the aqueous solution with a planetary ball mill for 1 hour to 5 hours.

Desirably, it may be carried out by stirring the mixture in which the carbon material is added to the aqueous solution with a planetary ball mill for 2 to 4 hours.

If stirring is performed for less than the above time period, the carbon material may not be sufficiently coated with phosphorus and boron, or phosphorus and boron may not be uniformly dispersed, and if the time range is exceeded, the process time may be unnecessarily increased.

According to one embodiment, it may further include a step of drying the carbon material coated with the aqueous solution after the step of coating the carbon material with the aqueous solution.

The drying step may be performed at a temperature of 50° C. to 100° C. for 8 hours to 15 hours.

According to one embodiment, the heat treatment step may be performed at a temperature of 500° C. to 1,000° C. for 3 hours to 10 hours.

Desirably, it may be performed at a temperature of 600° C. to 900° C. for 5 hours to 8 hours.

Another aspect of the present disclosure provides a supercapacitor including: a cathode containing the electrode material or an electrode material manufactured by the manufacturing method; an anode containing a metal material; an electrolyte; and a separator.

According to one embodiment, the metal material may include one or more selected from the group consisting of zinc, lithium, sodium, and potassium.

Desirably, the metal material may be zinc.

The zinc is not only a low-cost and environmentally friendly material, but also has characteristics of having high safety, low air sensitivity, high theoretical capacity (823 mAh/g. $Zn/Zn^{2+}$), and low oxidation-reduction potential (−0.76 V relative to standard hydrogen electrode).

According to one embodiment, as the electrolyte, a known conventional electrolyte may be used without limitation depending on the type of electrode material.

According to one embodiment, when the anode is zinc metal, the electrolyte may include $ZnSO_4$.

According to one embodiment, the supercapacitor according to the present disclosure has a specific capacity of 160 mAh/g or more at a current density of 0.5 A/g, and a specific capacity of 80 mAh/g or more at a current density of 10 A/g.

According to one embodiment, the supercapacitor according to the present disclosure has a specific capacity of 165 mAh/g or more at a current density of 0.5 A/g, and a specific capacity of 84 mAh/g or more at a current density of 10 A/g.

According to one embodiment, the supercapacitor according to the present disclosure has a specific capacity of 169 mAh/g or more at a current density of 0.5 A/g, and a specific capacity of 84 mAh/g or more at a current density of 10 A/g.

The supercapacitor according to the present disclosure exhibits high specific capacity at high current density.

According to one embodiment, the supercapacitor according to the present disclosure may have an energy density of 160 Wh/kg or more at a current density of 500 W/kg, and an energy density of 60 Wh/kg or more at a current density of 2.000 W/kg.

According to one embodiment, the supercapacitor according to the present disclosure may have an energy density of 169.4 Wh/kg or more at a current density of 500 W/kg, and an energy density of 66.7 Wh/kg or more at a current density of 2.000 W/kg.

The supercapacitor according to the present disclosure has characteristics of exhibiting excellent energy density.

According to one embodiment, the supercapacitor according to the present disclosure may have a capacity retention rate after 2.000 charge/discharge cycles of 95% or more at a current density of 0.5 A/g, and a capacity retention rate after 30,000 charge/discharge cycles of 85% or more at a current density of 10 A/g.

According to one embodiment, the supercapacitor according to the present disclosure may have a capacity retention rate after 30,000 charge/discharge cycles of 85% or more at a current density of 10 A/g.

In the supercapacitor according to the present disclosure, compared to a case where a carbon material doped with boron only is used as an electrode or a case where a carbon material doped with phosphorus only is used as an electrode, there is an effect of significantly improving cycling stability, and life performance according to ultra-fast charging and discharging.

According to one embodiment, the supercapacitor according to the present disclosure may be zinc-ion hybrid supercapacitors (ZICs).

According to one embodiment, the zinc-ion hybrid supercapacitors consist of: a zinc electrode (anode); a carbon material (cathode); a separator; and an electrolyte.

In the energy storage mechanism of the zinc-ion hybrid supercapacitors, deposition and stripping of zinc-ions toward the zinc electrode are made, and adsorption and desorption of the ions are made on the surface of the carbon material electrode. Therefore, the oxidation-reduction reaction at the zinc electrode and the electric double layer reaction at the carbon material electrode are used.

In particular, zinc is relatively stable compared to lithium, sodium, and potassium, has a high theoretical capacity, and has excellent compatibility with electrolytes, so that high energy density and long lifespan of the supercapacitors may be achieved.

In addition, general carbon material electrodes have low wettability with an electrolyte and poor ion diffusion ability, and thus have a low energy storage capacity according to a short charge-discharge time under high current density, thereby having the disadvantage of reducing the performance of the supercapacitors.

Meanwhile, the electrode using the carbon material doped with phosphorus and boron according to the present disclosure has the advantage of capable of improving the performance of the supercapacitors by improving wettability with an electrolyte and electrical conductivity.

Hereinafter, the present disclosure will be described in more detail by Example and Comparative Examples.

However, the following Example is only for illustrating the present disclosure, and the content of the present disclosure is not limited to the following Example.

Example 1. Preparation of Activated Carbon Doped with P and B

Activated carbon was added to an aqueous solution of 1 M red phosphorus (P) and 1 M boric acid ($H_3BO_3$).

The mixed solution was stirred in a planetary ball mill for 3 hours, and then the activated carbon coated with red phosphorus and boric acid was dried at 80° C. for 12 hours.

The dried activated carbon was calcined in a tube furnace under an argon atmosphere at 800° C. for 6 hours, and then washed with water.

Comparative Example 1. Preparation of Bare Activated Carbon

For comparison, bare activated carbon was prepared.

Comparative Example 2. Preparation of P-Doped Activated Carbon

For comparison, activated carbon doped only with phosphorus (P) was prepared in the same manner as in Example 1.

Comparative Example 3. Preparation of B-Doped Activated Carbon

For comparison, activated carbon doped only with boron (B) was prepared in the same manner as in Example 1.

Experimental Example 1. Confirmation of Physical and Chemical Properties of Electrode Materials In order to confirm the physical and chemical properties of the activated carbons of Example 1 and Comparative Examples 1 to 3, field emission scanning electron microscope (FESEM), transmission electron microscope (TEM), energy dispersive X-ray spectrometry (EDS) mapping, thermogravimetric analysis (TGA), X-ray diffraction analysis (XRD), and X-ray photoelectron spectroscopy (XPS) were used to confirm the structure, morphology, chemical properties, crystal structure, and chemical bonding state of the activated carbons of Example 1 and Comparative Examples 1 to 3.

FIG. 1 is a schematic view schematically illustrating a hybrid supercapacitor according to one embodiment of the present disclosure.

Referring to FIG. 1, a full-cell asymmetric supercapacitor using activated carbon doped with P and B as a cathode, $ZnSO_4$ as an electrolyte, and a Zn foil as an anode may be confirmed.

The supercapacitor having the above configuration may store electric charges by forming an electric double layer between the Faraday redox reaction of $Zn/Zn^{2+}$ occurring at the anode and sulfate ions at the cathode.

The lattice structures of normal carbon, P-doped carbon, B-doped carbon, and P and B-doped carbon may be identified. The P atom replacing the two edge carbon atoms in the P and B-doped carbon lattice may show tetracoordinate, and thus it may be seen that it forms an oxygen-containing functional group. $PCO_3$. This may improve the electrochemical performance by improving wettability, ion diffusion rate, and charge connection.

In addition, a carbon atom may be replaced by a B atom and create $BC_3$ in the $Csp_2$ framework, and accordingly, the electrical conductivity may be increased by inducing changes in the electron density state and electronic structure of the carbon atom.

Figure 2:
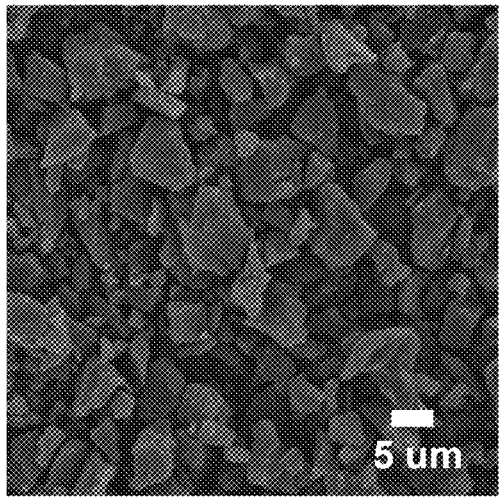
FIG. 2 is FESEM images of the activated carbons of Example 1 and Comparative Examples 1 to 3.
Figure 2:
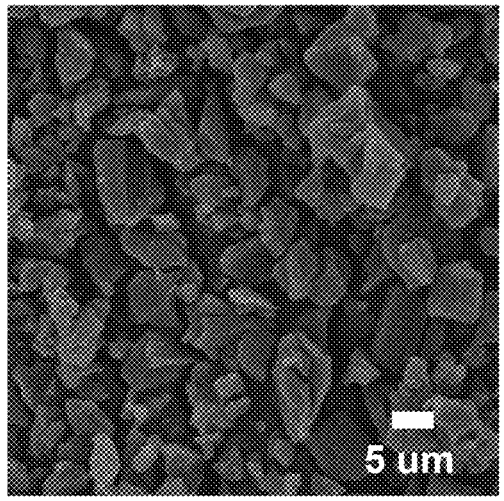
Figure 2:
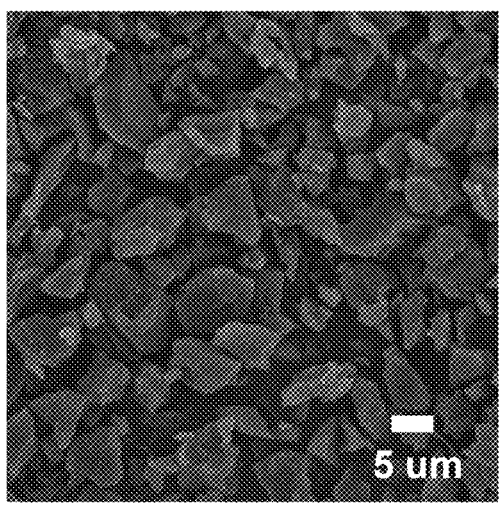
Figure 2:
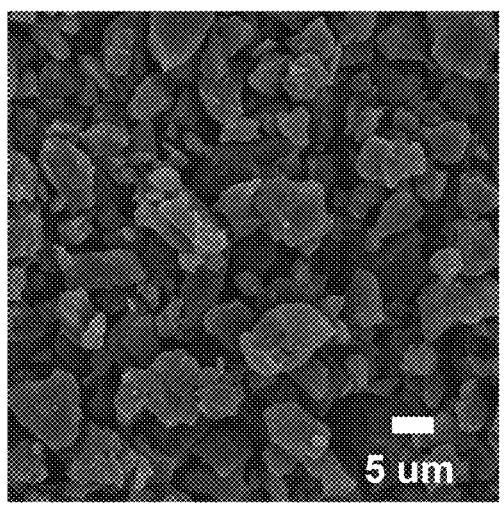

FIG. 2 is FESEM images of the activated carbons of Example 1 and Comparative Examples 1 to 3.

Referring to FIG. 2, it may be confirmed that the activated carbons of Example 1 and Comparative Examples 1 to 3 were shown to have diameters of approximately 6.7 to 9.9 μm, 5.8 to 10.0 μm, 6.3 to 10.1 μm, and 6.1 to 10.2 μm, did not show a specific shape, and were not significantly changed by doping.

Figure 3:
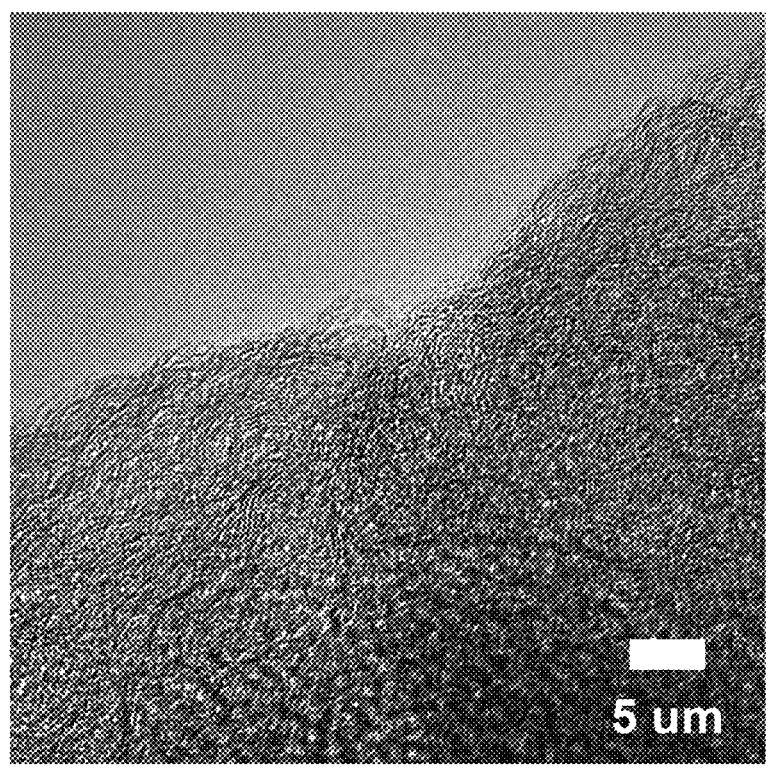
FIG. 3 is a TEM image of the activated carbon of Example 1.

FIG. 3 is a TEM image of the activated carbon of Example 1.

Referring to FIG. 3, it may be confirmed that the activated carbon doped with P and B shows a uniform contrast in the TEM image, and through this, it may be seen that the activated carbon doped with P and B is composed of only single carbon.

Figure 4:
FIG. 4 is TEM-EDS mapping images of the activated carbon of Example 1.
Figure 4:
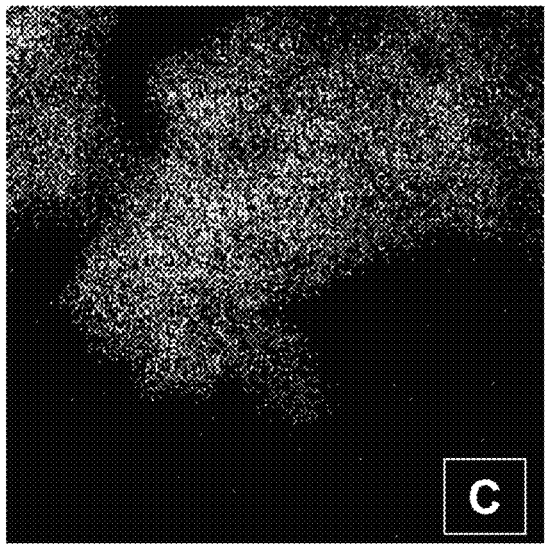
Figure 4:
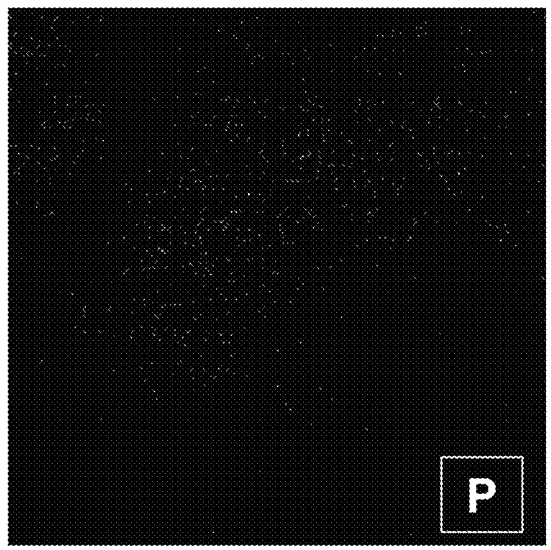
Figure 4:
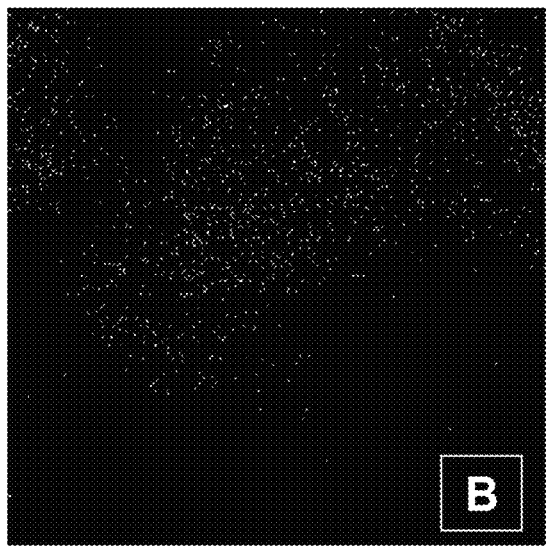

FIG. 4 is TEM-EDS mapping images of the activated carbon of Example 1.

Referring to FIG. 4, it may be confirmed that carbon, phosphorus, and boron are uniformly dispersed in the activated carbon.

Figure 5:
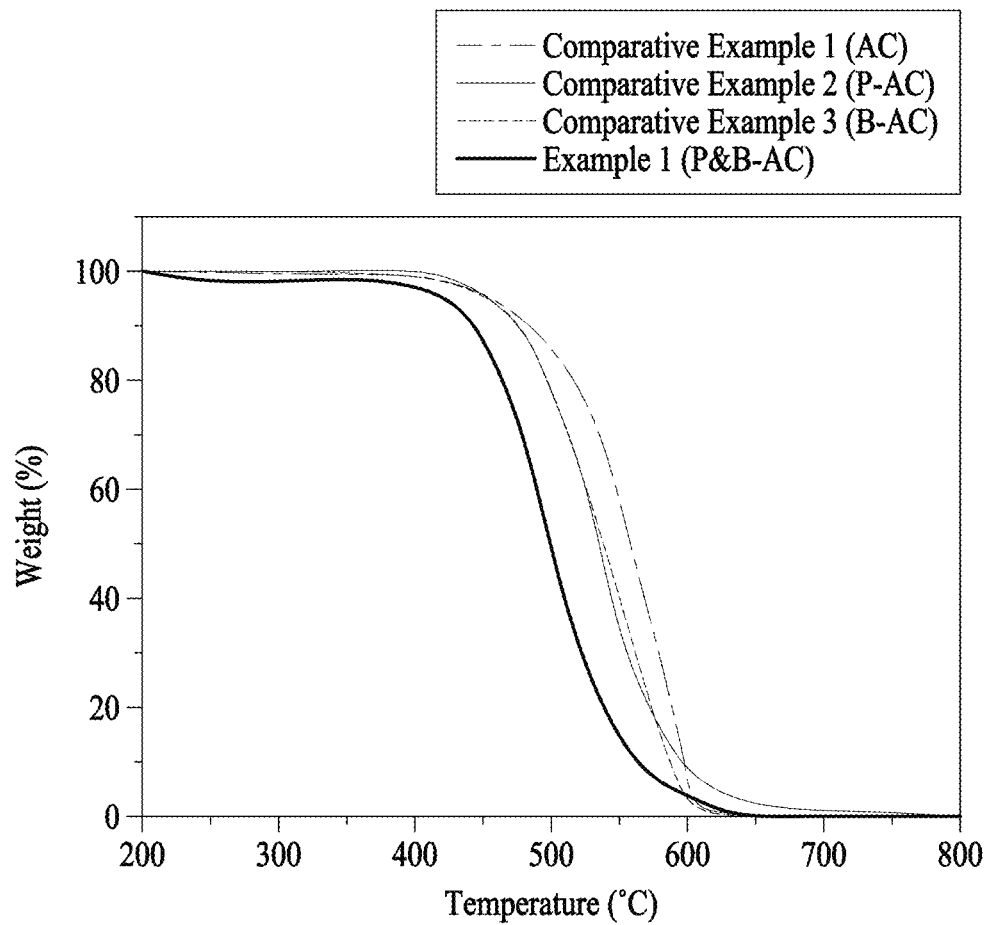
FIG. 5 is thermogravimetric analysis (TGA) results of the activated carbons of Example 1 and Comparative Examples 1 to 3.

FIG. 5 is thermogravimetric analysis (TGA) results of the activated carbons of Example 1 and Comparative Examples 1 to 3.

Specifically, it is TGA results of investigation under an air atmosphere at a temperature of 200° C. to 800° C. and a heating rate of 10° C./min.

Referring to FIG. 5, since the weight loss of 100% is shown as the temperature increases in both Example and Comparative Examples, it may be confirmed that only one carbon is present and there is no impurity.

Figure 6:
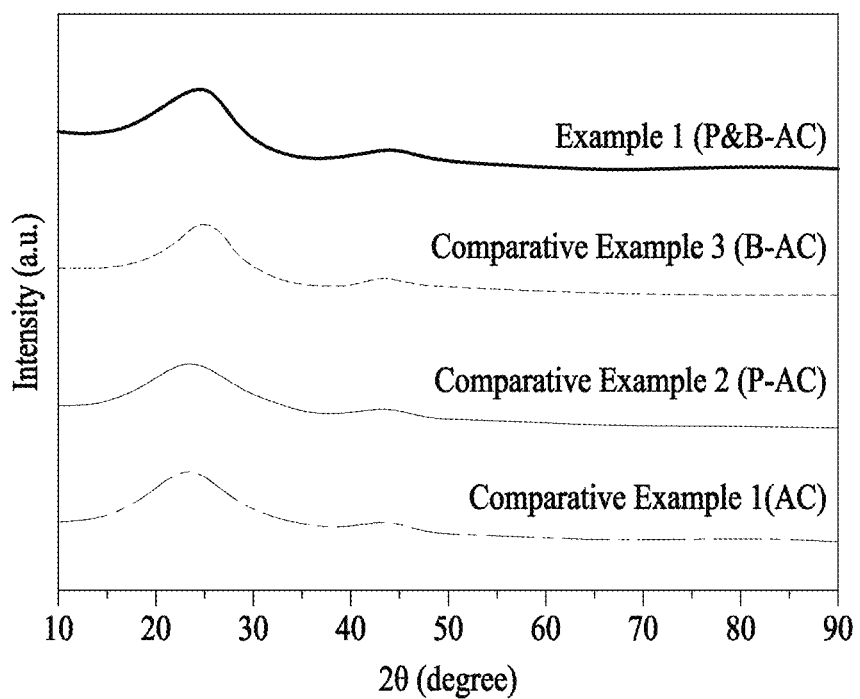
FIG. 6 is XRD analysis results of the activated carbons of Example 1 and Comparative Examples 1 to 3.

FIG. 6 is XRD analysis results of the activated carbons of Example 1 and Comparative Examples 1 to 3.

Referring to FIG. 6, it may be confirmed that both of Example and Comparative Examples show broad diffraction peaks at approximately 25° and 44°, respectively, by corresponding to the (002) and (101) layers of graphitic carbon, and it may be seen from this that the crystal structure has not changed through doping.

Figure 7:
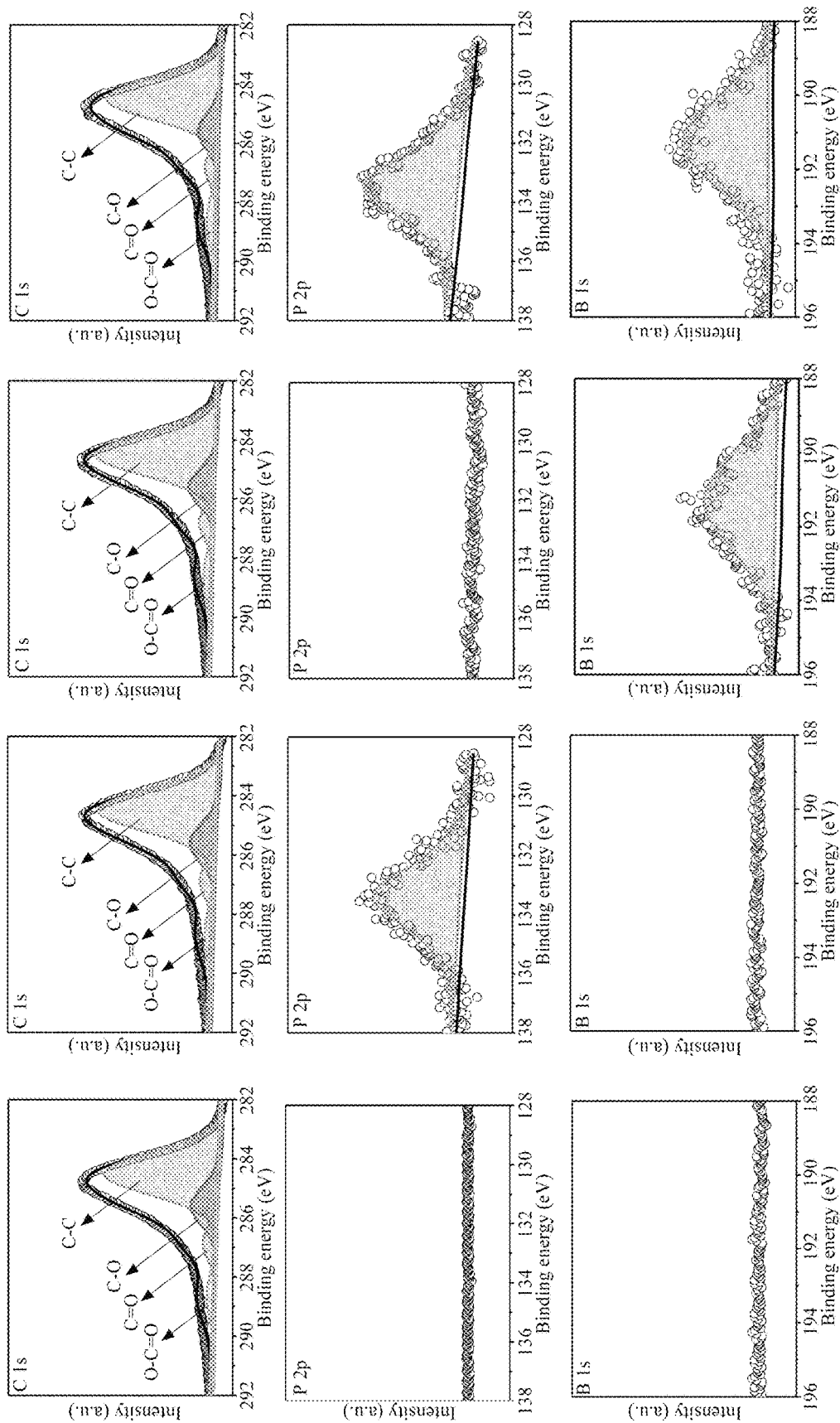
FIG. 7 is XPS analysis results of the activated carbons of Example 1 and Comparative Examples 1 to 3.

FIG. 7 is XPS analysis results of the activated carbons of Example 1 and Comparative Examples 1 to 3.

Referring to FIG. 7, it may be confirmed that peaks appeared clearly at 133.0 eV corresponding to PC covalent bond ($PCO_3$) in Example 1 and Comparative Example 2, and peaks appeared clearly at 193.8 eV corresponding to $BC_3$ in Example 1 and Comparative Example 3. From this, it may be seen that $PCO_3$ and $BC_3$ were formed in the activated carbon of Example 1.

Experimental Example 2. Confirmation of Wettabilities of Electrolyte at Electrode Material Interfaces The wettabilities of the electrolyte at the interfaces of the activated carbons of Example 1 and Comparative Examples 1 to 3 were confirmed through a contact angle measurement system.

Figure 8:
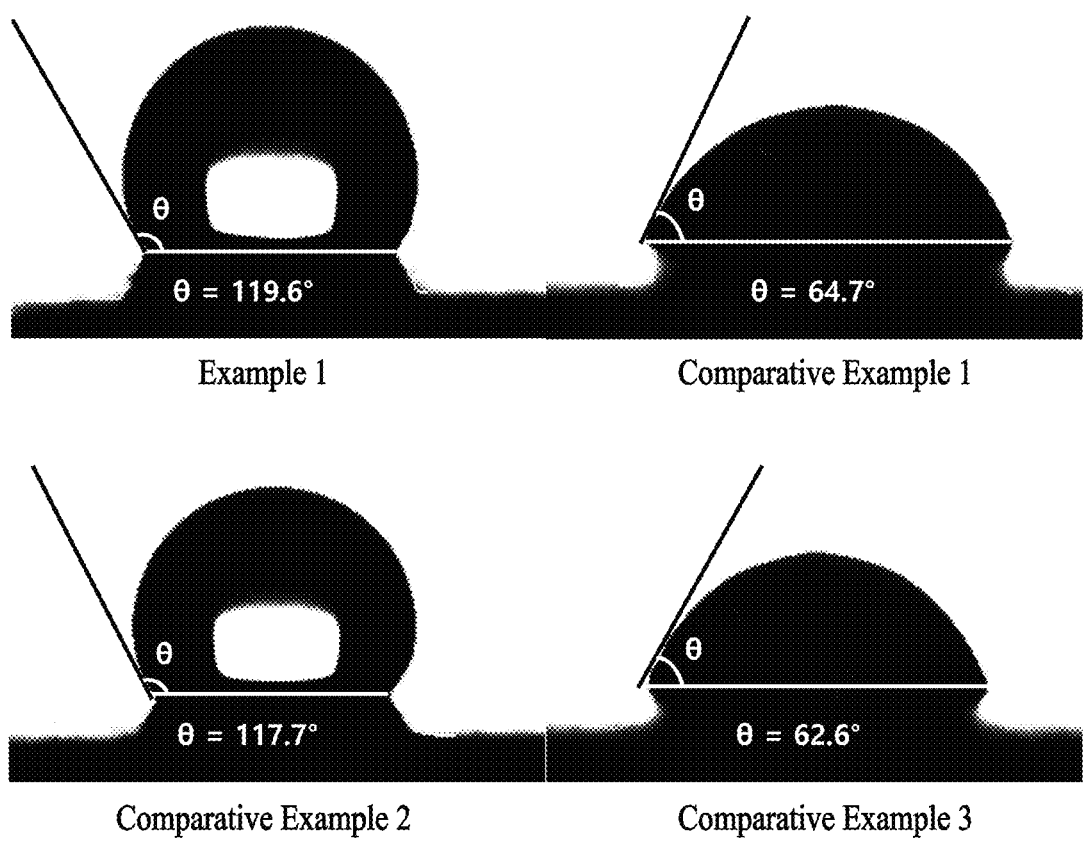
FIG. 8 is images showing the contact angles of the electrolyte on the interfaces of the activated carbons of Example 1 and Comparative Examples 1 to 3.

FIG. 8 is images showing the contact angles of the electrolyte on the interfaces of the activated carbons of Example 1 and Comparative Examples 1 to 3.

Referring to FIG. 8, it may be confirmed that the contact angles at the interfaces of the activated carbons of Example 1 and Comparative Examples 1 to 3 were shown to be 119.6°, 64.7°, 117.7°, and 62.6°, respectively, and the contact angles of the electrolyte at the interfaces of the P-doped activated carbon of Comparative Example 2 and the P and B-doped activated carbon of Example 1 were reduced.

Through this, it may be seen that oxygen-containing $PCO_3$ is formed by doping of P. and this may improve the wettability between the electrolyte and the electrode, and ultimately allow the electrolyte to easily access the electrode, thereby improving the energy storage performance of the supercapacitor.

Experimental Example 3. Confirmation of Electrochemical Properties of Supercapacitors Using Electrode Materials Electrochemical properties of full-cell systems composed by using Zn foil as an anode, 2M zinc sulfate ($ZnSO_4$) as an electrolyte, and the activated carbons of Example 1 and Comparative Examples 1 to 3 as a cathode were measured.

A mixed slurry for the cathode electrode was prepared using, as an active material, N-methyl-2-pyrrolidone, polyvinylidene difluoride, and Ketjen black at a ratio of 8:1:1.

To investigate the electrochemical dynamics of the supercapacitor, electrochemical impedance spectroscopy (EIS) was performed by applying an AC signal of 5 mV in the frequency range of $10^5$ to $10^{-2}$ Hz.

In order to investigate the redox reaction of the supercapacitor, cyclic voltammetry (CV) was performed using a potentiostat/galvanostat at a scan rate of 10 mV/s.

Charge and discharge measurements were performed at various current densities from 0.5 A/g to 10.0 A/g in the potential range of 0.3 V to 1.9 V. The lifetime of the supercapacitor was tested up to 2,000 and 30,000 cycles, respectively, at current densities of 0.5 A/g and 10.0 A/g, FIG. 9 is Nyquist plots in the frequency range of $10^5$ to $10^{-2}$ Hz of supercapacitors using activated carbons of Example 1 and Comparative Examples 1 to 3 as an electrode material.

Figure 9:
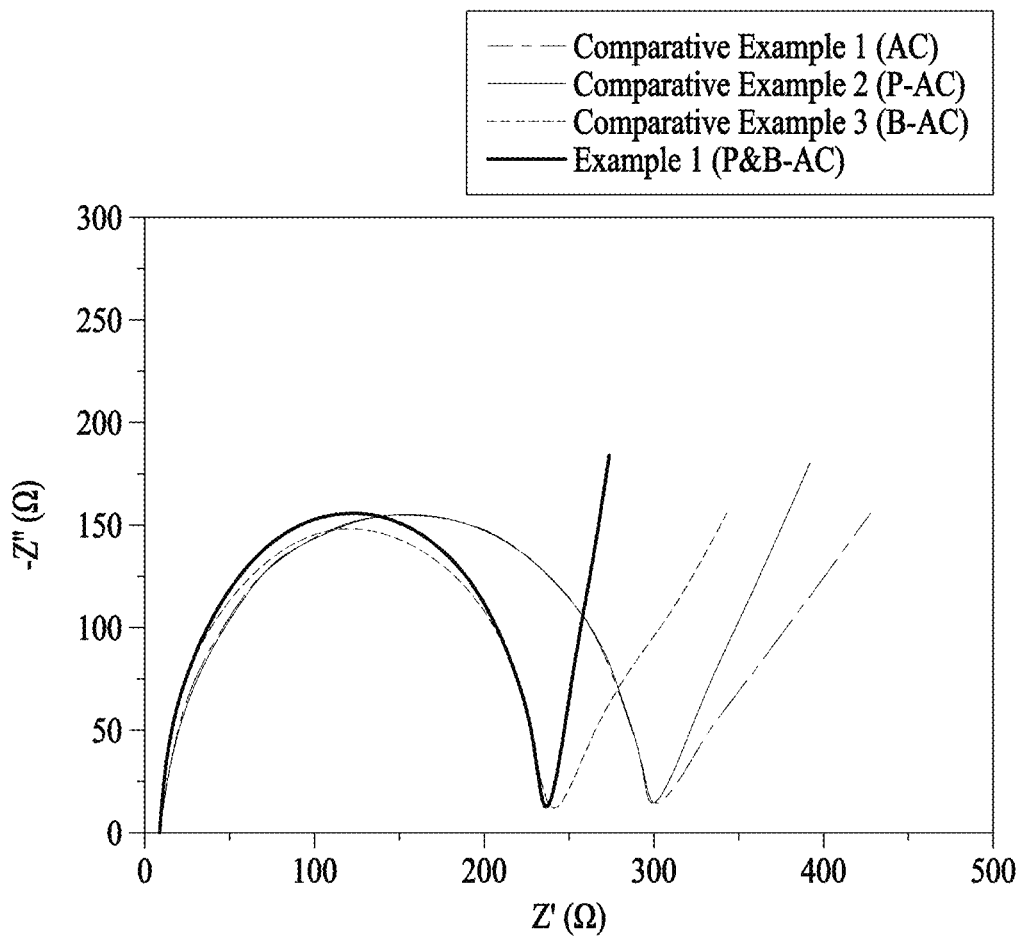
FIG. 9 is Nyquist plots in the frequency range of $10^5$ to $10^{-2}$ Hz of supercapacitors using activated carbons of Example 1 and Comparative Examples 1 to 3 as an electrode material.

Referring to FIG. 9, it may be confirmed that the diameters of the semicircles in the high frequency region representing the charge transfer resistance (Rct) are decreased in Comparative Examples 1 and 2 compared to Comparative Example 3 and Example 1, and it may be seen that this is due to an increase in the electrical conductivity by B doping.

Here, the slope in the low-frequency region represents the ionic diffusion behavior at the interface between the electrolyte and the electrode (called Warburg impedance) so that the steepest slope corresponds to the lowest Warburg impedance and highest ion diffusion.

Compared to the slopes of Comparative Examples 1 and 3, the steep slopes of Comparative Example 2 and Example 1 are the effect due to P doping that improves the wettability between the electrode and the electrolyte.

Through this, it may be seen that, due to the simultaneous doping effect of P and B, the activated carbon electrode material of Example 1 exhibits both excellent charge transfer and ion diffusion ability.

Figure 10:
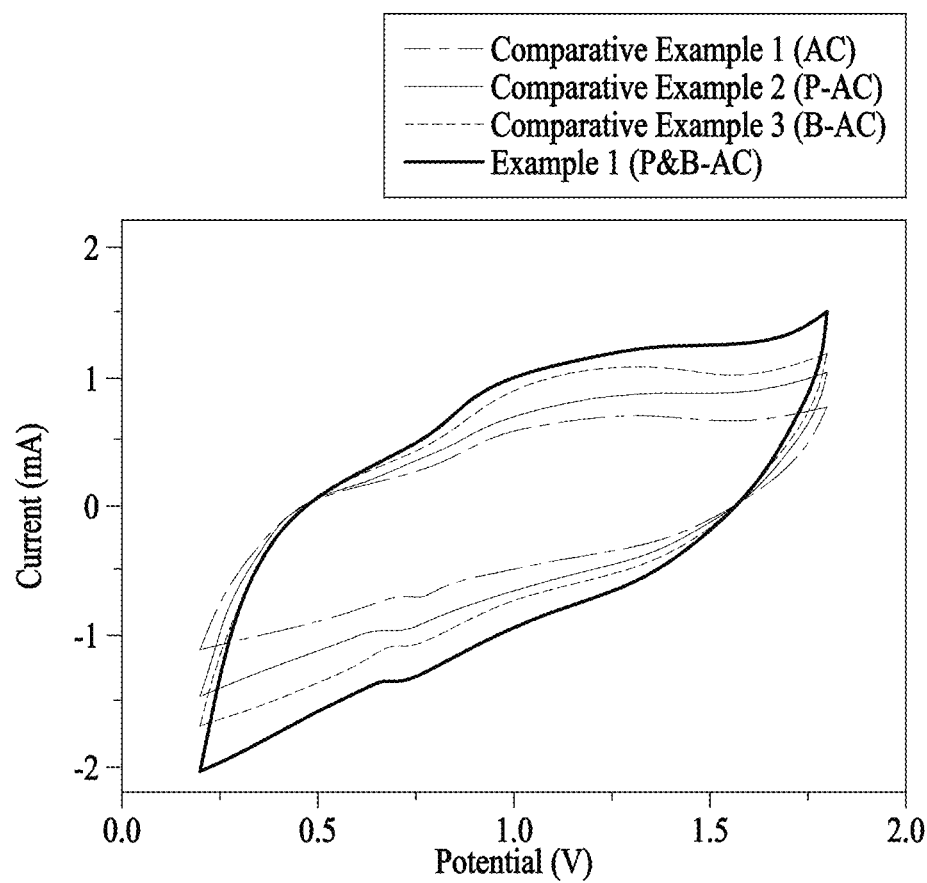
FIG. 10 is CV curves in a potential range of 0.2 V to 1.8 V and at a scan rate of 10 Mv/s of supercapacitors using activated carbons of Example 1 and Comparative Examples 1 to 3 as an electrode material.

FIG. 10 is CV curves in a potential range of 0.2 V to 1.8 V and at a scan rate of 10 Mv/s of supercapacitors using activated carbons of Example 1 and Comparative Examples 1 to 3 as an electrode material.

Referring to FIG. 10, it may be confirmed that the CV curves of the supercapacitors using activated carbons of Example 1 and Comparative Examples 1 to 3 as an electrode material show redox humps representing a Faraday redox reaction due to deposition and stripping of Zn ions ($Zn \leftrightarrow 2e- + Zn^{2+}$), and this shows the typical action of a zinc-ion hybrid supercapacitor.

Figure 11:
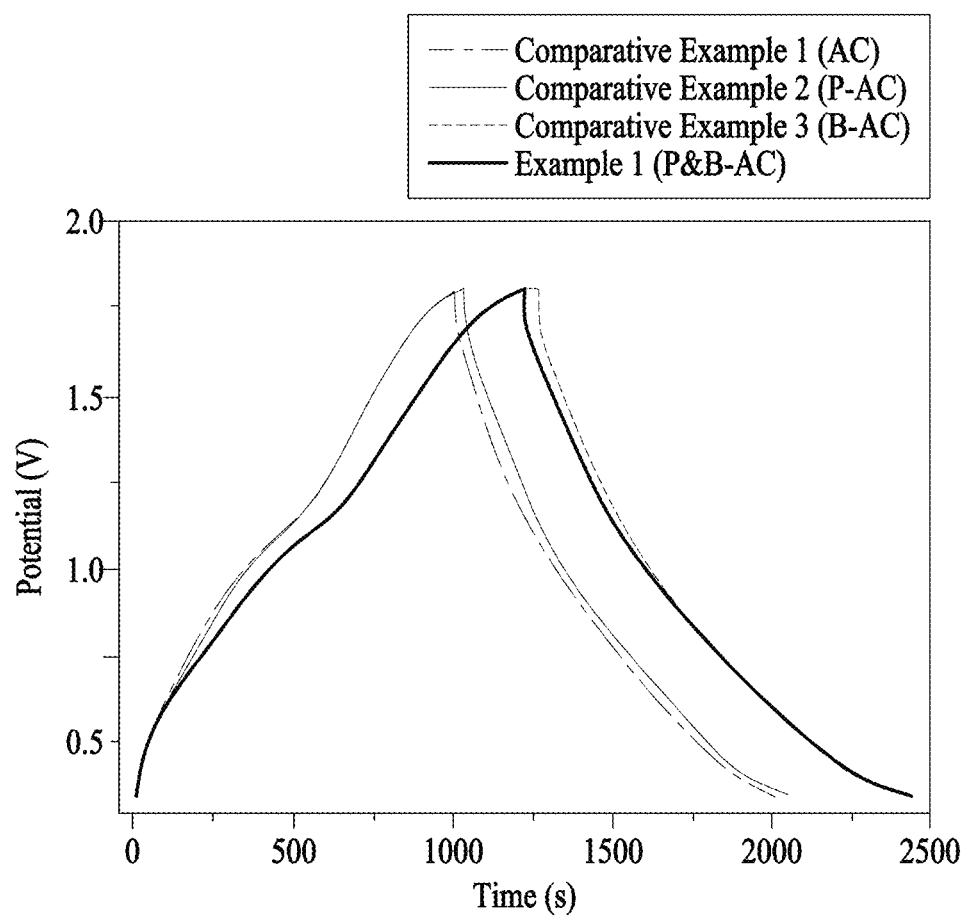
FIG. 11 is charge-discharge curves at a current density of 0.5 A/g of supercapacitors using activated carbons of Example 1 and Comparative Examples 1 to 3 as an electrode material.

FIG. 11 is charge-discharge curves at a current density of 0.5 A/g of supercapacitors using activated carbons of Example 1 and Comparative Examples 1 to 3 as an electrode material.

Referring to FIG. 11, it may be confirmed that each curve exhibits an excellent reversible reaction by marking a quasi-triangular shape together with similar charging and discharging times.

In addition, since the charging-discharging times of Example 1 and Comparative Example 3 are longer than those of Comparative Examples 1 and 3, it may be seen that B doping improves electrical conductivity.

Figure 12:
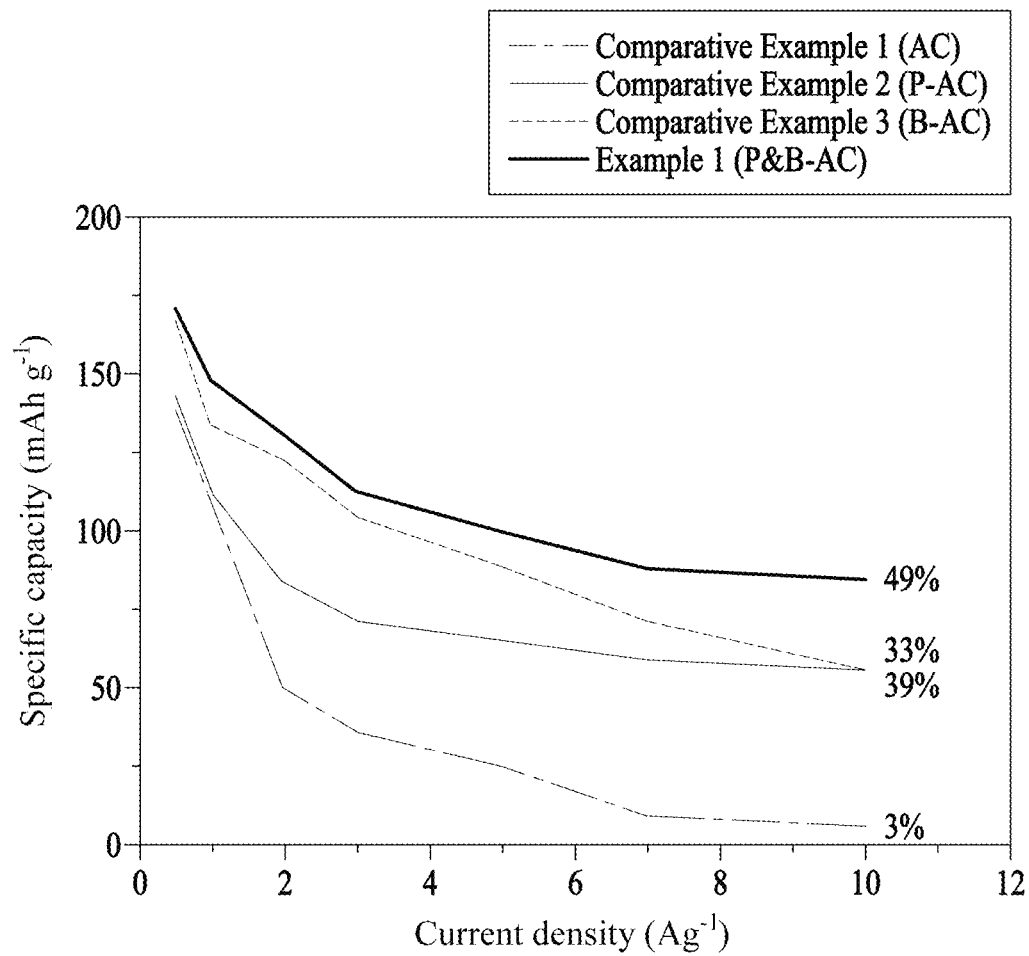
FIG. 12 shows specific capacities in the potential range of 0.3 V to 1.9 V and the current density range of 0.5 A/g to 10.0 A/g of supercapacitors using activated carbons of Example 1 and Comparative Examples 1 to 3 as an electrode material.

FIG. 12 shows specific capacities in the potential range of 0.3 V to 1.9 V and the current density range of 0.5 A/g to 10.0 A/g of supercapacitors using activated carbons of Example 1 and Comparative Examples 1 to 3 as an electrode material.

Specifically, at a current density of 0.5 A/g, the specific capacities of Comparative Examples 1 to 3 and Example 1 were calculated to be 140.6 mAh/g. 142.6 mAh/g. 167.4 mAh/g, and 169.4 mAh/g, respectively. That is. Comparative Example 3 and Example 1 showed higher specific capacities, and it may be seen that this is due to the B doping effect.

In addition, as the current density increased from 0.5 A/g to 10.0 A/g, the specific capacity of Comparative Example 1 rapidly decreased from 140.6 mAh/g to 5.6 mAh/g (retention rate 3%). Compared to this, Comparative Examples 2 and 3 and Example 1 exhibited retention rates of 39% (from 142.6 mAh/g to 55.6 mAh/g), 33% (from 167.4 mAh/g to 55.6 mAh/g), and 49% (from 169.4 mAh/g to 84.0 mAh/g), respectively.

That is, the supercapacitor using the activated carbon of Example 1 as an electrode material exhibited the maximum specific capacity due to the synergistic effect of P and B doping.

Figure 13:
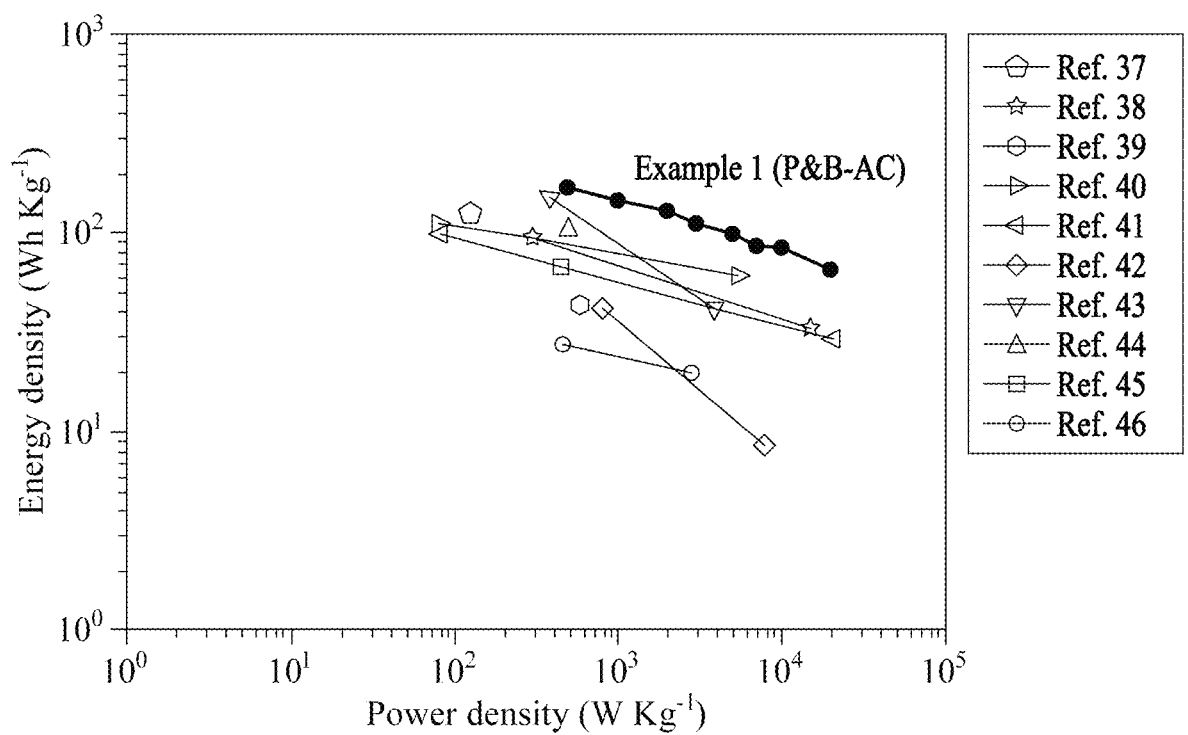
FIG. 13 is a Ragone plot showing energy and power densities in the range of 500 to 20,000 W/kg of a supercapacitor using activated carbon of Example 1 as an electrode material.

FIG. 13 is a Ragone plot showing energy and power densities in the range of 500 to 20,000 W/kg of a supercapacitor using activated carbon of Example 1 as an electrode material.

Referring to FIG. 13, it may be confirmed that the supercapacitor using the activated carbon of Example 1 as an electrode material exhibits excellent energy densities of 169.4 Wh/kg and 66.7 Wh/kg, respectively, at power densities of 500 W/kg and 20,000 W/kg.

Figure 14:
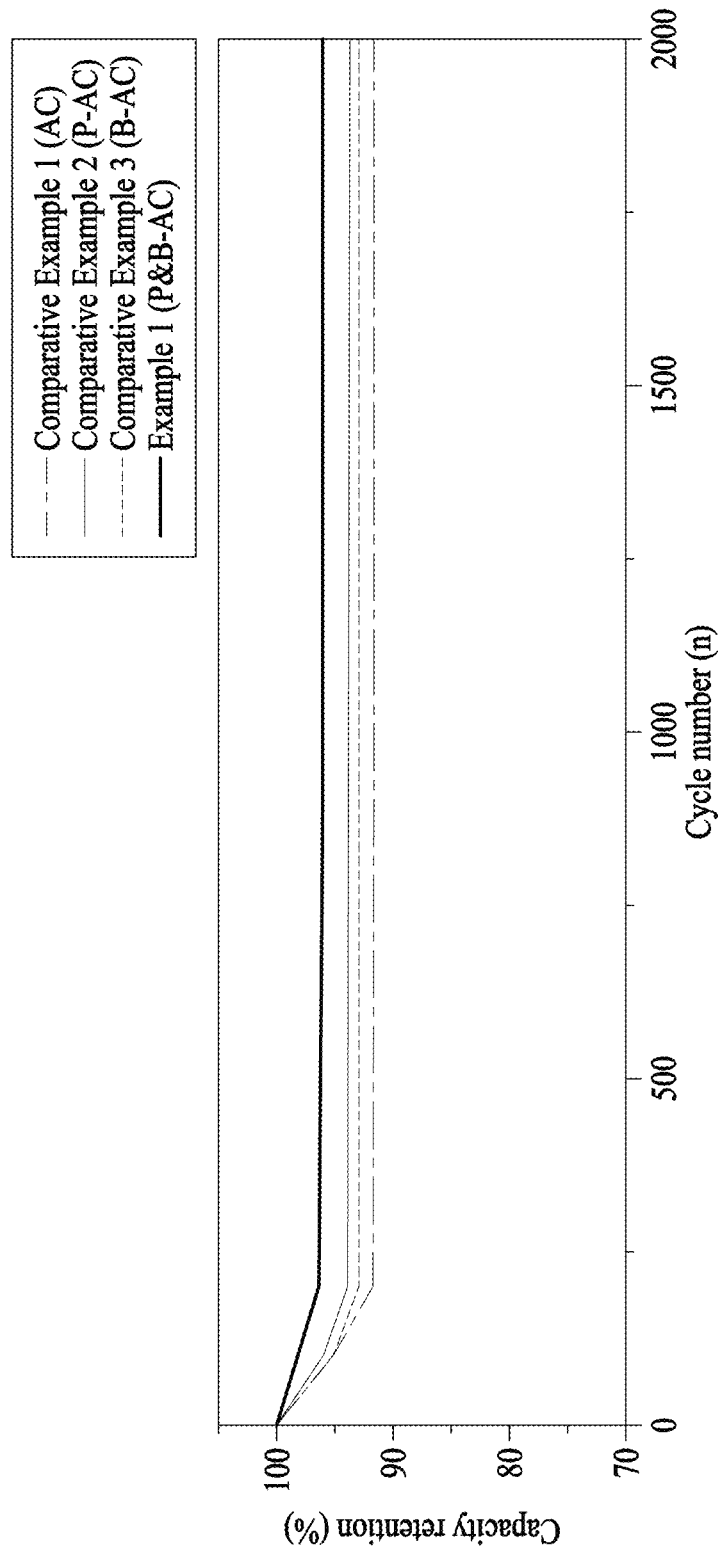
FIG. 14 is a graph showing cycling stabilities for up to 2.000 cycles at a current density of 0.5 A/g of supercapacitors using activated carbons of Example 1 and Comparative Examples 1 to 3 as an electrode material.

FIG. 14 is a graph showing cycling stabilities for up to 2,000 cycles at a current density of 0.5 A/g of supercapacitors using activated carbons of Example 1 and Comparative Examples 1 to 3 as an electrode material.

Figure 15:
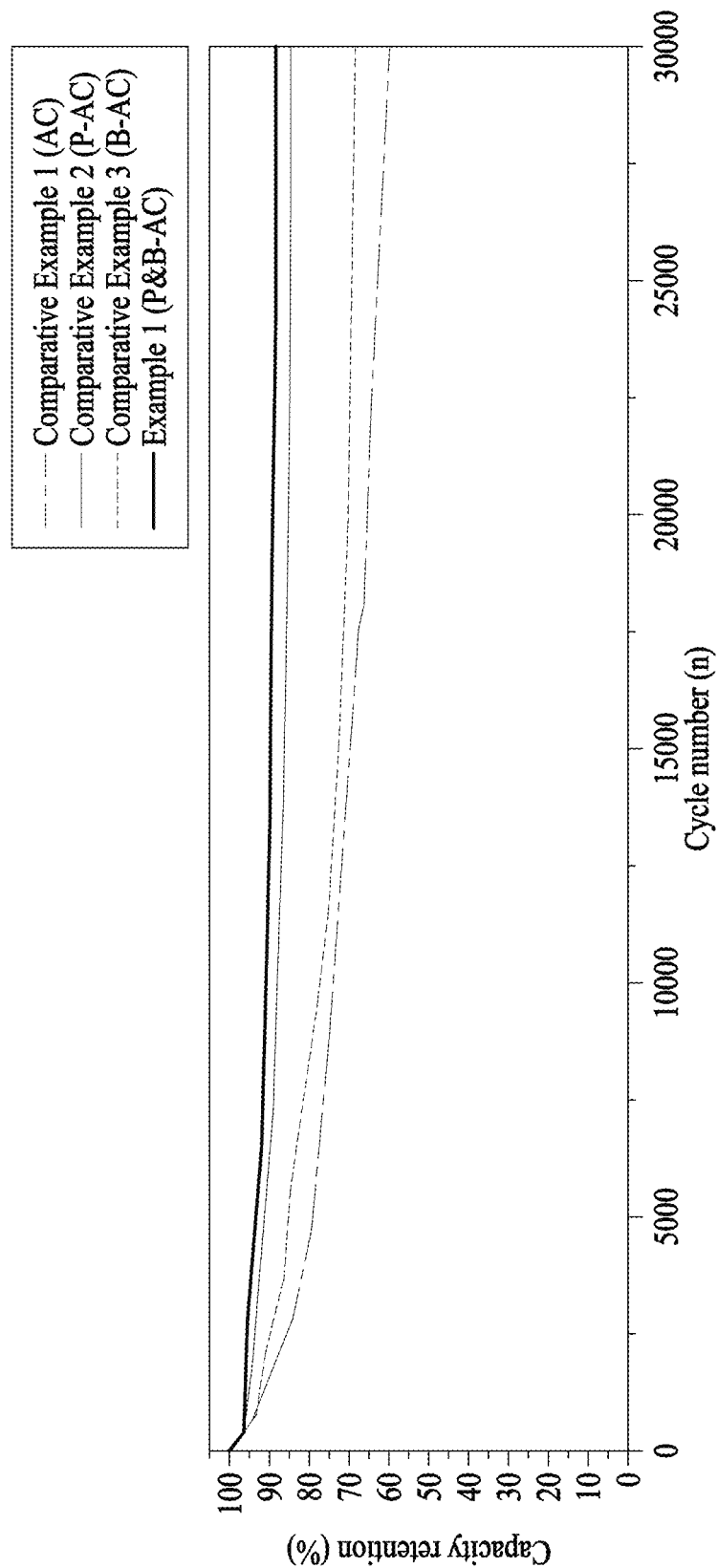
FIG. 15 is a graph showing cycling stabilities for up to 30,000 cycles at a current density of 10 A/g of supercapacitors using activated carbons of Example 1 and Comparative Examples 1 to 3 as an electrode material.

FIG. 15 is a graph showing cycling stabilities for up to 30,000 cycles at a current density of 10 A/g of supercapacitors using activated carbons of Example 1 and Comparative Examples 1 to 3 as an electrode material.

Figure 16:
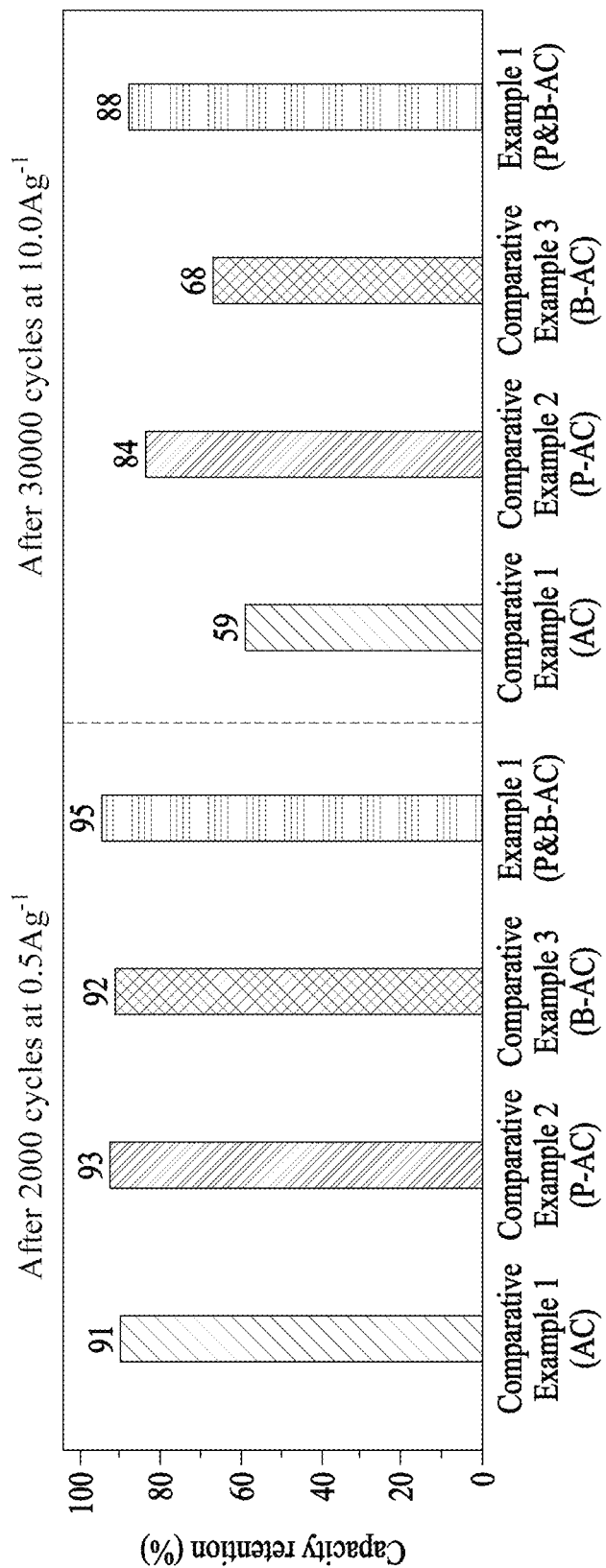
FIG. 16 is graphs showing capacity retention rates measured from a cycling stability test and an ultra-high lifespan test.

FIG. 16 is graphs showing capacity retention rates measured from a cycling stability test and an ultra-high lifespan test.

Referring to FIGS. 14 to 16, it may be confirmed that the capacity retention rates after 2.000 cycles at a current density of 0.5 A/g of the supercapacitors using the activated carbons of Comparative Examples 1 to 3 and Example 1 as an electrode material were shown to be 91%. 93%. 92%, and 95%, respectively, and it may be confirmed that the capacity retention rates after 30,000 cycles at a current density of 10 A/g of the supercapacitors using the activated carbons of Comparative Examples 1 to 3 and Example 1 as an electrode material were shown to be 59%. 84%, 68%, and 88%, respectively.

Through this, it may be seen that the supercapacitor using activated carbon simultaneously doped with P and B as an electrode material exhibited high specific capacity, excellent high-speed performance, excellent cycling stability, and ultra-high speed long life performance, resulting in improved energy storage performance.

Figure 17:
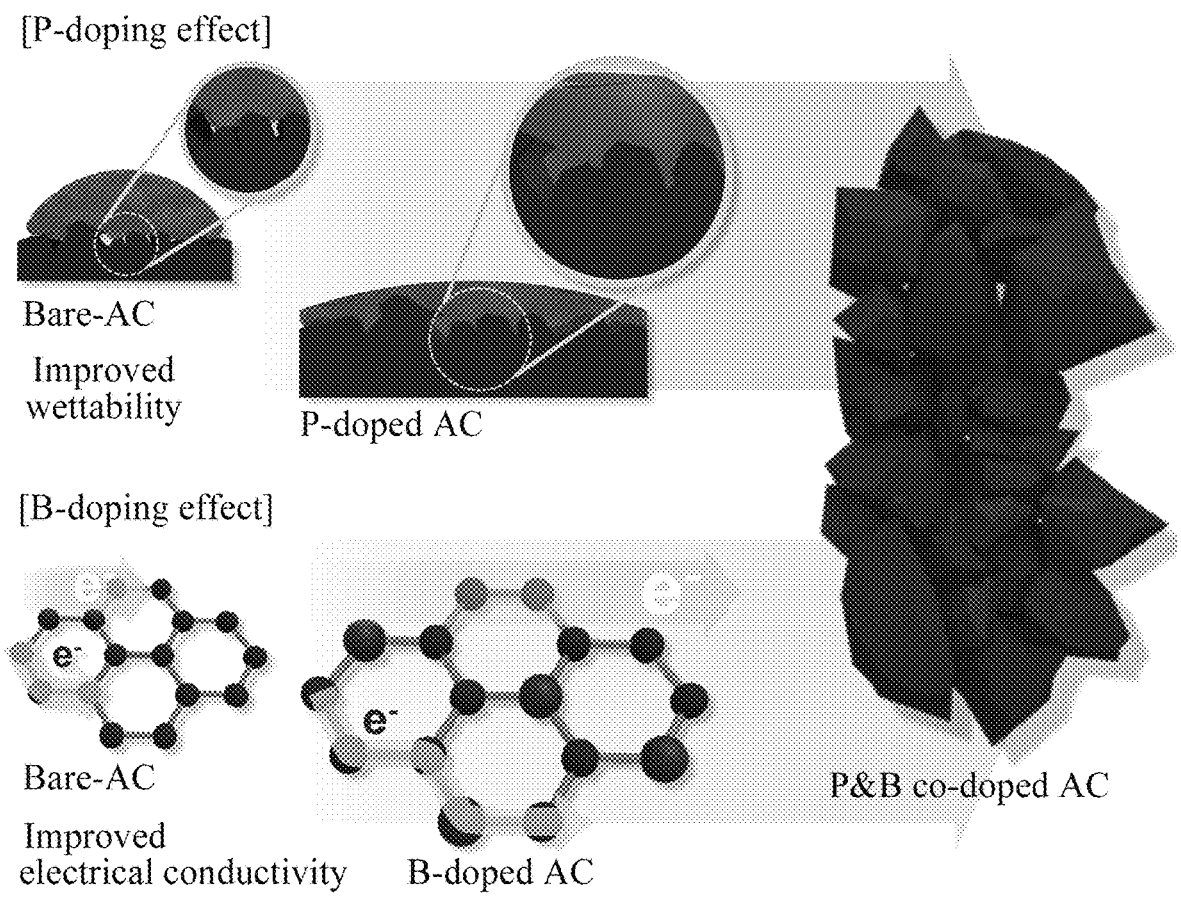
FIG. 17 is a view showing the effect of improving wettability and electrical conductivity of an electrode material according to one embodiment of the present disclosure.

FIG. 17 is a view showing the effect of improving wettability and electrical conductivity of an electrode material according to one embodiment of the present disclosure.

Referring to FIG. 17, it may be seen that the oxygen-containing group formed by P doping improves the wettability between the electrolyte and the electrode to improve ultra-high speed long life performance, and the B doping improves electrical conductivity through a change in the electronic structure.

Although the above-mentioned examples have been described by limited drawings, those skilled in the art may apply various technical modifications and alterations based on the above-mentioned description. For example, appropriate results may be achieved although described techniques are carried out in a different order from a described method, and/or described elements of a system, structure, apparatus, circuit, etc. are combined or mixed in a different form from the described method, or replaced or substituted with other elements or equivalents.

Therefore, other implementations, other examples, and equivalents to the claim scope also belong to the scope of the following claims.

The invention claimed is:

1. A supercapacitor electrode material comprising:
a carbon material comprising a carbon lattice structure; and
phosphorus (P) and boron (B) doped on the carbon material,
wherein the phosphorus atom is contained in an amount of 0.01 atomic % to 10 atomic %,
the boron atom is contained in an amount of 0.01 atomic % to 10 atomic %,
phosphorus and boron have a molar ratio in a range of 1:0.1 to 10, and
some carbons in the carbon lattice structure are replaced with phosphorus and boron to form $PCO_3$ and $BC_3$.

2. The supercapacitor electrode material of claim 1, wherein the carbon material comprises one or more selected from the group consisting of activated carbon, graphene, graphite, carbon nanotubes, carbon nanofibers, and fullerenes.

3. A supercapacitor comprising:
a cathode containing the electrode material of claim 1;
an anode containing a metal material;
an electrolyte; and
a separator.

4. The supercapacitor of claim 3, wherein the metal material comprises one or more selected from the group consisting of zinc, lithium, sodium, and potassium.

5. The supercapacitor of claim 3, wherein the supercapacitor has a specific capacity of 160 mAh/g or more at a current density of 0.5 A/g, and a specific capacity of 80 mAh/g or more at a current density of 10 A/g.

6. The supercapacitor of claim 3, wherein the supercapacitor has a capacity retention rate after 2,000 charge/discharge cycles of 95% or more at a current density of 0.5 A/g, and a capacity retention rate after 30,000 charge/discharge cycles of 85% or more at a current density of 10 A/g.

7. The supercapacitor of claim 3, wherein the supercapacitor is zinc-ion hybrid supercapacitors (ZICs).

8. A method for manufacturing a supercapacitor electrode material, the method comprising:
preparing an aqueous solution in which a red phosphorus and a boron precursor are mixed;
coating a carbon material with the aqueous solution; and
heat-treating the carbon material coated with the aqueous solution in an inert atmosphere,
wherein the carbon material comprises one or more selected from the group consisting of activated carbon, graphene, graphite, carbon nanotubes, carbon nanofibers, and fullerenes, and
the carbon material comprises a carbon lattice structure.

9. The method for manufacturing a supercapacitor electrode material of claim 8, wherein the boron precursor comprises one or more selected from the group consisting of $B_2O_3$, $B(OC_2H_5)_4$, and $H_3BO_3$.

10. The method for manufacturing a supercapacitor electrode material of claim 8, wherein the boron precursor and the red phosphorus have a molar ratio in a range of 1:0.1 to 10.

11. The method for manufacturing a supercapacitor electrode material of claim 8, further comprising:
drying the carbon material coated with the aqueous solution after the coating the carbon material with the aqueous solution.

* * * * *